Figure 5:
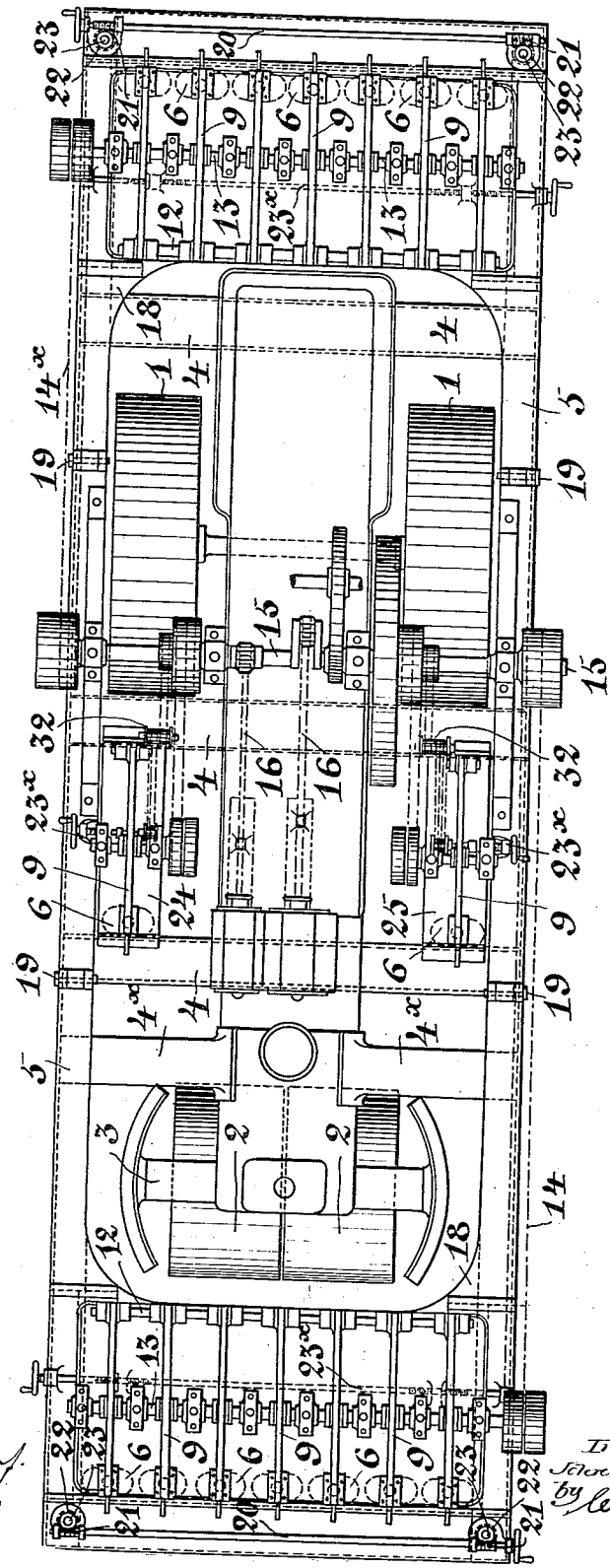

J. E. BEHMER.
MACHINE FOR THE FORMATION OF COVERINGS ON STREETS, ROADS, AND OTHER PLACES.
APPLICATION FILED DEC. 12, 1906.
910,636.
Patented Jan. 26, 1909.
3 SHEETS—SHEET 1.
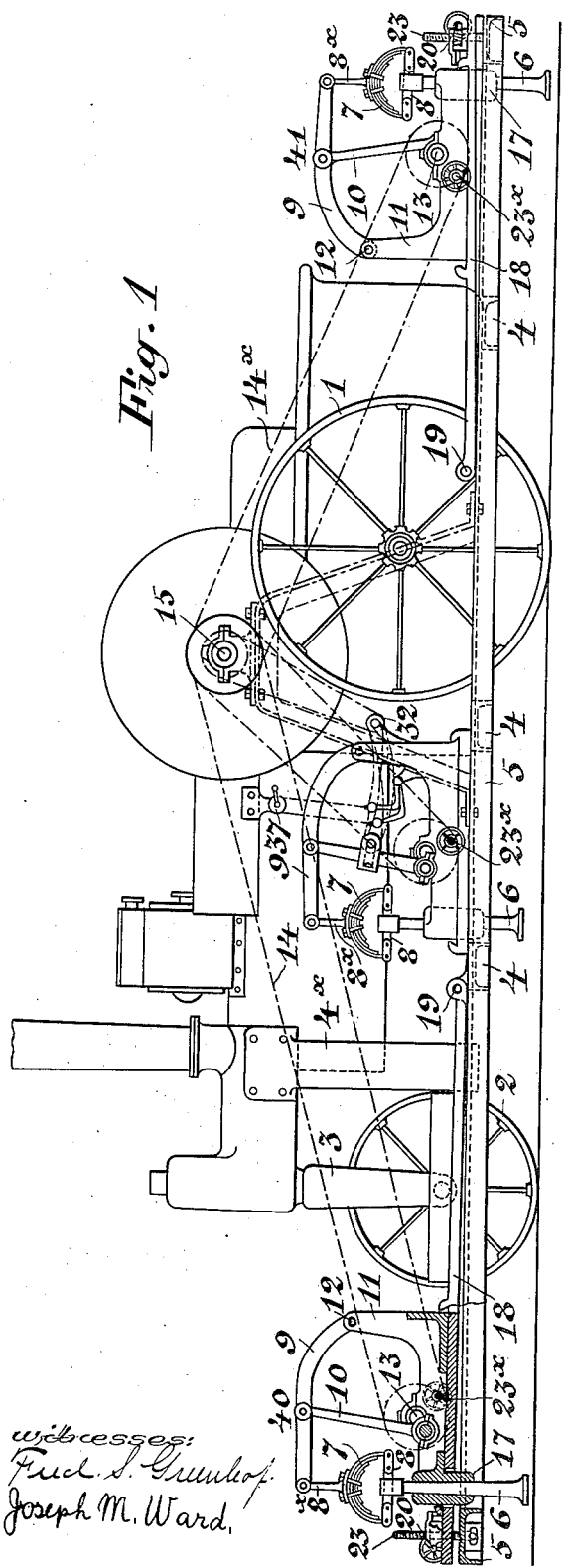
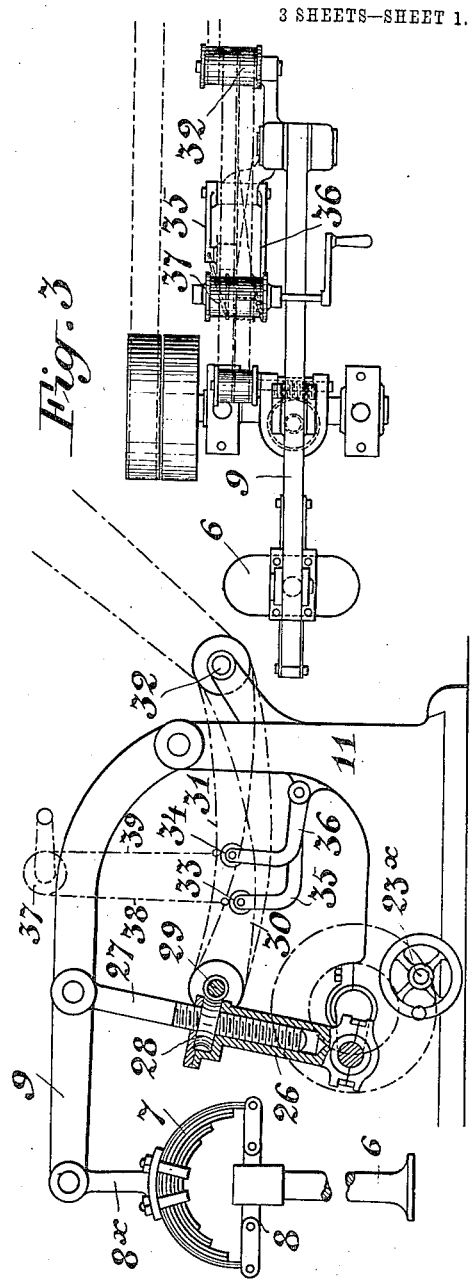
Witnesses:
Fred S. Grunhof
Joseph M. Ward
Inventor.
John Emil Behmer,
by Cerely & Gregory
Attys.

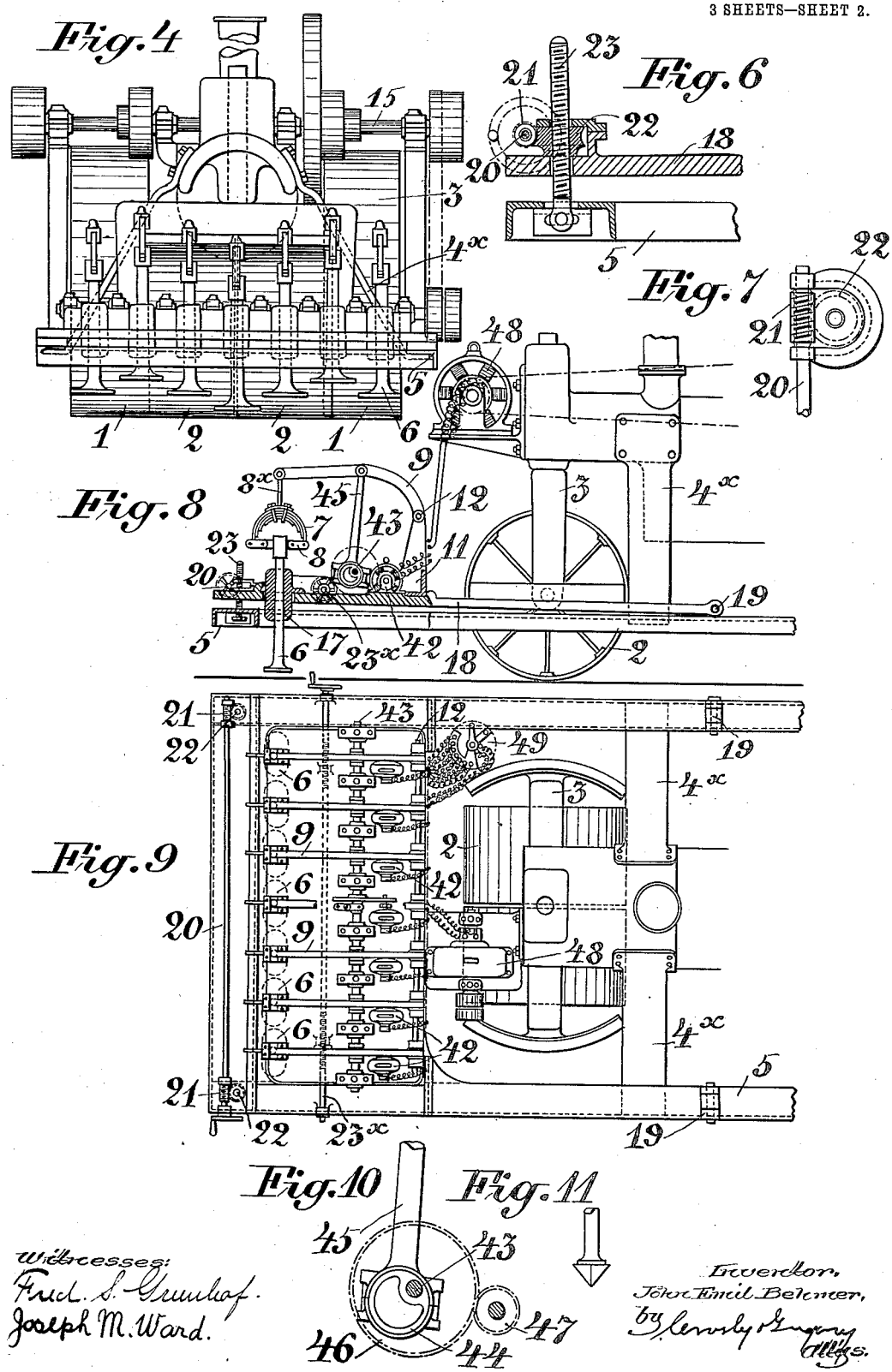

J. E. BEHMER.
MACHINE FOR THE FORMATION OF COVERINGS ON STREETS, ROADS, AND OTHER PLACES.
APPLICATION FILED DEC. 12, 1906.

910,636.

Patented Jan. 26, 1909.

3 SHEETS—SHEET 3.

Witnesses:
Fred S. Grunlof.
Joseph M. Ward.

Inventor.
John Emil Behmer,
by Cerenly & Gregory
Attys.

UNITED STATES PATENT OFFICE.

JOHN EMIL BEHMER, OF ESKILSTUNA, SWEDEN.

MACHINE FOR THE FORMATION OF COVERINGS ON STREETS, ROADS, AND OTHER PLACES.

No. 910,636.　　　　Specification of Letters Patent.　　　Patented Jan. 26, 1909.

Application filed December 12, 1906. Serial No. 347,464.

*To all whom it may concern:*

Be it known that I, JOHN EMIL BEHMER, a subject of the King of Sweden, and resident of Rademachergatan 36, Eskilstuna, in the Kingdom of Sweden, have invented certain new and useful Improvements in Machines for the Formation of Coverings on Streets, Roads, and other Places, of which the following is a specification, reference being had therein to accompanying drawings.

This invention relates to a machine for the formation of a covering on streets, roads and other places according to a new method, consisting in spreading over the surface, which is to be covered, a kind of coarse mortar, composed of small stones (broken or natural) and a slowly flowing and somewhat sticky combining substance as for instance asphalt, asphalt-tar or the like worked with the stones until the whole is of suitable consistence, the said mortar being then by forcible ramming or stamping forced together to a compact mass. Trials made have shown that covering made in this manner is very hard and durable due to the fact that it is insoluble in water and is tough and elastic. The said covering also has the advantage of binding the dust and deadening sounds. The ramming or stamping operation forms an important feature in the said covering system. The mixing of the stones and the combining substance is completed by the same in such manner, that the small stones are shivered and the pieces stick together owing to the combining substance and form a kind of close and tough mass, which becomes very hard.

My invention relates to a machine by means of which the said ramming or stamping operation can be effected rapidly and perfectly.

It consists of the combination of a roller, similar to the roller used for macadamizing, and a system of hammer like ramming organs, so mounted that, when the roller is moved forward or backward, the said ramming organs move in advance, forcing the mass together, the roller then removing small unevennesses, if any. Consequently, the work effected by the machine substantially differs from the rolling operation in ordinary macadamizing. Rolling, alone, would leave the mass almost in the same condition as when spread, as the stones are not shivered. And their sharp edges are not knocked off by the said operation. Besides, rolling alone can not be used, when there is a sufficient quantity of combining substance in the mass, for the reason that the mass, owing to the combining substance, will swell in front of the roller and is moved forward in the shape of a wave, continuously increasing and thus preventing the work to be performed or making the result unsatisfactory with regard to uniform hardness and so on. Consequently, an important condition for the covering getting uniform hardness is that the mass is not displaced or forced sidewise by the roller. This condition is fulfilled by the machine now in question.

In the accompanying drawings Figure 1 is a side view of the machine. Fig. 2 is a side view of a part of the machine on a greater scale, and Fig. 3 is a plan view of the same part. Fig. 4 is an end view of the machine and Fig. 5 is a plan view of the same. Figs. 6 and 7 are details. Fig. 8 is a side view and Fig. 9 is a plan view of a modified form of the machine. Fig. 10 is a detail of the said modification. Fig. 11 shows a modified detail.

The roller-machine, which is like a vehicle with very broad supporting wheels, may be provided with a steam engine if steam is to be used as motive power. The said machine has two rear supporting wheels 1, 1 and two great fore wheels 2, 2, forming together the roller-cylinder of the machine, which roller-cylinder is mounted in a rotatory fork 3 in the well known manner, so that the roller-cylinder by means of chains or the like, (not shown in the drawings) connected with the fork can be turned sidewise for the steering.

A horizontal frame 5 is fixed to the roller-machine or vehicle by means of cross-beams 4 and iron supports $4^{\times}$, said frame forming a support for the rammer mechanisms. The said mechanisms are arranged in substantially the same manner as the known machine-hammers and provided with crank, lever and crank rod and are so many in number that, when the machine is advanced, a surface is worked at a time in width corresponding to the width of the machine or substantially so. A set of rammer mechanisms is provided at the front end of the machine and a set at the rear end of same, a rammer mechanism being besides provided at each side of the machine. In Figs. 1 and 5 the front and rear set respectively consists of seven rammer mechanisms abreast, but any other suitable number may be used. Each hammer or rammer mechanism consists of the rammer or hammer body 6, the spring 7 comprising a plurality of curve shaped springs, to the connecting band 8 of which the body 6 is fixed, the lever 9, an arm or link 8×, pivoted to the said lever and fixed to the spring 7, and the crank rod 10, acting upon the lever. All seven of the rammer mechanisms have a common bracket or frame 11, in which a shaft 12 common to all the levers 9 and a crank shaft 13 common to all crank rods are journaled, said shaft 13 being supported by a plurality of bearings situated between the cranks and rotated by means of a belt by the elongated main shaft 15 of the machine, supported by special brackets. The belt driving the front set of rammer mechanisms is designated by 14 and the one belonging to the rear set by 14×. The shaft 15, which is a crank shaft, is rotated by the steam engine, the crank rods 16 of which are shown in Fig. 5. The ramming body is guided by the socket shaped part 17 of the frame 11. The cranks of the shaft 13 may have the same direction, so that the ramming bodies are descended at the same time, or, which is better, have different directions, so that the bodies 6 work alternately. The whole set of rammer mechanisms can be raised and lowered and moved sidewise. For that purpose the bracket 11 is mounted on an upper plate 18, extending longitudinally to the frame 5 and hinged to the same at its inner edge at 19. A shaft 20 is journaled on the plate, at an angle to the longitudinal axis of the machine, and provided with worms 21 gearing with worm wheels 22 mounted on and engaging with screws 23, which are fixed in the bottom frame 5 and pass through the plate. Consequently, when the shaft 20 is rotated, the plate with the whole series of rammer mechanisms will be raised or lowered. In this manner the force of the blows effected by the ramming organs can easily be adjusted, the movement of the spring and consequently the stroke of the organ being greater for a greater distance from the surface of the covering. In the drawings hand-wheels are fixed on the shaft 20 for rotating the same manually, but a suitable motion transmitting device, driven by the shaft 15 may be used for the said purpose. The said bracket 11 can be moved in a guide transversely to the plate 18 by a screw 23× for moving the rammer mechanisms sidewise. For the same purpose the bracket 11 may swing around a pivot or the like. The rammer mechanisms may, if desired, be mounted directly on the frame 5, which is then arranged in such manner that it can be raised or lowered. The frame 5 may be provided at its lower side with swinging bearing rollers, situated at the ends of the frame and, if desired, arranged in such manner, that they can be used for the said raising and lowering.

The side-ramming-mechanisms designated by 24 and 25, are arranged in the same manner as those described above and for that reason their parts are designated by the same references as in the front and the rear sets. Also the side mechanisms are provided with a screw 23× for moving the same laterally. However, a special arrangement is provided for raising and lowering the ramming organ, shown on an enlarged scale in Figs. 2 and 3. The crank rod is composed of two parts 26, 27, one slid into the other. The inner part consists of a screw with which engages a worm-wheel 28, journaled in the outer part, said worm-wheel gearing with a worm 29 journaled on the part 26. The said worm is provided with pulleys and is connected by means of a crossed belt 30 and an open belt 31 with an auxiliary shaft 32, which is connected with the main shaft 15 by means of a belt and pulleys. The belts 30, 31 are so slack, that the crank can rotate without being hindered by the same. When the belt 30 or 31 is tightened, the worm-wheel 28 will be rotated in one direction or the other, the crank-rod being then elongated and shortened respectively. In this manner the ramming body can easily be raised and lowered. For tightening the said belts tightening pulleys 33, 34 are provided, journaled on an arm 35, 36, respectively and connected with a drum 37 by a rope 38, 39 respectively one of the said ropes being wound round the drum in one direction and the other one in opposite direction. Consequently, in rotating the drum in one direction the one belt is tightened, while the other is slack, and in rotating the drum in the opposite direction the belt last mentioned is tightened, while the belt first mentioned is left in a slack condition.

The machine is advanced by a suitable motion transmitting device provided between the shaft 15 and the shaft of the rear supporting wheels. The said motion transmitting device, which may be of the same kind as in roller-machines hitherto known, is so adjusted in relation to the velocity of the ramming organs, which make about 300 blows in the minute, that the machine is moved only a very short distance for each blow of the ramming organs. The machine is moved forward and backward on the place to be covered. During the movement of the machine in one direction, forward, the front set 40 of rammer mechanisms are actuated, while the rear set 41 of rammer-mechanisms are inactive, and when the machine is moved in the opposite direction, the rear set of mechanisms 41 are actuated, while the front set of mechanisms are inactive. However, both sets may be actuated simultaneously, if necessary. The side rammer-mechanisms 24, 25 are generally actuated, when the machine passes near one of the edges of the street, road etc., in which case the rammer-mechanism situated nearest to the said edge, is actuated, but the side rammer-mechanisms may be actuated whensoever for increasing the firmness of the covering at the edges of the path of the engine, so that no spots of incompact mass are left at the same.

The above explanations of the mode of action of the machine are, probably, sufficient. Owing to the action of the rammers the spread mass is so forcibly compressed, that it forms a firm surface, on which the roller-cylinder 2 and the wheels 1 can easily pass, the inconvenience of the wheels sinking down in the mass, as in ordinary rolling, when the street etc. is being macadamized, being thus wholly avoided. Moreover by the ramming operation the surface becomes dressed, so that no sharp projections will remain on the same, and the combining substance is caused by the action of the rammers reminding of kneading or working, to form, together with the small, solid particles a homogeneous mass, which is very hard and compact. Small unevennesses resulting from the ramming operation are removed by the roller. The machine is moved over the same surface one time or many times, as is necessary in each case.

The power source may be of any suitable kind. As for instance a gas motor or the like may be substituted for the steam engine. Electric power may also be used, as shown in Figs. 8 and 9. Each ramming organ of the set is driven by a small electric motor 42 which by means of toothed wheels or friction wheels 47, 46 rotates a shaft 43, provided with an eccentric 44, acting upon the lever 9 by means of the rod 45. An ordinary crank may be substituted for the eccentric. The motors are connected with the dynamo 48 by means of wires in such manner, that any one or any ones or all of them may be kept in motion, which is easily effected by means of a switch-board 49, provided with a crank, push-buttons or the like. If there is an electric power station near the place, the said motors may be supplied with current from the same through suitable wires. An electric motor may then be used also for moving the machine. The supporting wheels and the roller-cylinder may, evidently, be arranged in several manners, the main point being that they are so wide that they remove all unevennesses.

The machine may be simplified in such manner, that it is provided with one or more ramming organs at its one end only. The ramming organs may, if necessary, be mounted in a row longitudinally to the machine, as is the case with three ramming organs in the drawings, mounted behind each other at each side of the machine. The ramming organs may be mounted also in a row extending in an oblique direction over the machine, or in a zigzag line or in any other manner. If there is only one ramming organ or only two organs at the side of each other in the same place of the machine (at the end of the same), the said organs are preferably so arranged, that they can be swung around a pivot, as stated above. The head of the ramming organ is then preferably made wider, so that nevertheless a comparatively great surface is worked at the same time.

Evidently the term "covering" used above does not exclude the using of the machine for other purposes as for instance for picking up old coverings, ice etc., a ramming head of another suitable shape, as for instance of a pointed shape, shown in Fig. 11, being then used.

Having now described my invention, what I claim as new and desire to secure by Letters Patent is:

1. In a machine for the purpose specified, the combination of a set of ramming organs for ramming down the material, and a roller mounted in a frame provided with supporting wheels, said roller serving to smooth down the covering, with a vertically adjustable support mounted on said frame and carrying the ramming organs, and means for raising and lowering said support to the height desired.

2. In a machine for the purpose specified, the combination of a plurality of ramming organs for ramming down the material, and a roller mounted in a frame provided with supporting wheels, said roller serving to smooth down the covering, with a vertically adjustable support mounted on said frame and carrying the ramming organs, and a screw mechanism for raising and lowering said support whereby the ramming organs may be simultaneously adjusted to the proper distance from the ground for the required blow.

3. In a machine for the purpose specified, the combination of a roller located at the front end of the machine, a set of ramming organs mounted in front of said roller and serving to smooth down the material, a vertically adjustable support for raising and lowering said ramming organs, ramming organs located at the sides of the machine, with a lever, a crank rod acting upon said lever and composed of two parts adjustable with relation to each other, and means for adjusting said parts to lengthen or shorten the crank rod.

4. In a machine for the purpose specified, a rolling device supported by wheels, ramming heads supported by the frame of said device and acting upon the material, a lever and crank mechanism for actuating said heads, the crank rod of said mechanism being composed of two parts slidable with relation to each other by means of a screw mechanism, two belts for actuating said mechanism in one direction or the other, and means for tightening the said belts alternately.

5. In a machine for the purpose specified, a rolling device supported by wheels, ramming heads supported by the frame of said device and acting upon the material, a lever and crank mechanism for actuating said heads, the crank rod of said mechanism being composed of two parts slidable with relation to each other by means of a screw mechanism, two belts for actuating said mechanism in one direction or the other, tightening pulleys for said belts, swinging arms on which said pulleys are journaled supported by ropes, and a roller round which said ropes are wound in opposite directions.

In testimony whereof, I have signed my name to this specification in the presence of two subscribing witnesses.

JOHN EMIL BEHMER.

Witnesses:
CARL FIRBERG,
ROBERT APELGREN.